United States Patent
Massa et al.

(10) Patent No.: US 6,670,110 B1
(45) Date of Patent: Dec. 30, 2003

(54) PHOTOGRAPHIC MULTILAYER FILM BASE COMPRISING 1,4-CYCLOHEXANE DIMETHANOL

(75) Inventors: Dennis J. Massa, Pittsford, NY (US); Michael R. Brickey, Webster, NY (US); Jose R. Garcia, Webster, NY (US); Thomas M. Laney, Spencerport, NY (US); YuanQiao Rao, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/327,373

(22) Filed: Dec. 20, 2002

(51) Int. Cl.[7] .................. G03C 1/765; G03C 1/795; G03C 1/93; B32B 27/06; B32B 27/36
(52) U.S. Cl. .................. 430/494; 430/496; 430/533; 264/173.15; 264/210.7; 428/480
(58) Field of Search .................. 430/496, 533, 430/494; 428/480; 264/173.15, 210.7, 173.16

(56) References Cited

U.S. PATENT DOCUMENTS

| | | | |
|---|---|---|---|
| 5,034,263 A | 7/1991 | Maier et al. | 428/480 |
| 5,288,601 A | 2/1994 | Greener et al. | 430/533 |
| 5,387,501 A | 2/1995 | Yajima et al. | 430/533 |
| 5,556,739 A | 9/1996 | Nakanishi et al. | 430/533 |
| 5,759,756 A | 6/1998 | Laney et al. | 430/533 |
| 6,468,726 B2 * | 10/2002 | Haraoka et al. | 430/533 |
| 6,555,303 B1 * | 4/2003 | Rao et al. | 430/533 |
| 6,558,884 B1 * | 5/2003 | Greener et al. | 430/533 |

FOREIGN PATENT DOCUMENTS

WO  WO 01/34391 A1  5/2001

* cited by examiner

Primary Examiner—Richard L. Schilling
(74) Attorney, Agent, or Firm—Chris P. Konkol

(57) ABSTRACT

This invention relates to a poly(ethylene terephthalate) photographic multilayer film base having improved properties with regard to cutting, stiffness and curl property. The multilayer film base comprises a multilayer structure, in which a tie layer comprises a PET-based polyester material having a specified amount of monomeric units derived from 1,4-cyclohexanedimethanol (CHDM), such that the support layers of the multilayer film base does not delaminate. This PET-based polyester material can be obtained either by the addition/blending of polyester polymers containing CHDM monomeric units to PET material and/or the incorporation of CHDM monomer units into a PET-polymer backbone at appropriate levels.

25 Claims, No Drawings

PHOTOGRAPHIC MULTILAYER FILM BASE COMPRISING 1,4-CYCLOHEXANE DIMETHANOL

RELATED APPLICATIONS

This application is related to copending, commonly assigned applications U.S. Ser. No. 10/325,386, U.S. Ser. No. 10/327,365, U.S. Ser. No. 10/036/668, now U.S. Pat. No. 6,558,884, and U.S. Ser. No. 10/027,023, now U.S. Pat. No. 6,555,303, thereby all incorporated by reference in their entirety.

FIELD OF THE INVENTION

This invention relates to a polyester photographic multilayer film base having improved properties and to a method of preparing the same. More particularly, the invention relates to a poly(ethylene terephthalate)-based photographic multilayer film base having improved properties with regard to slitting, perforating and other finishing or cutting operations. The multilayer film base comprises a tie layer having a controlled amount of monomeric units derived from 1,4-cyclohexane dimethanol (CHDM) such that delamination of the multilayer film base is prevented.

BACKGROUND OF THE INVENTION

Silver-halide photographic elements comprise one or more light-sensitive layers coated on a support. Typically the support comprises a sheet of a transparent or translucent film, commonly referred to as a film base. Other layers, such as backing or subbing layers, may be laminated onto either side of the film base. Common film-base materials for photographic elements are cellulose triacetate (CTA) and poly(ethylene terephthalate) (PET). More recently it has been proposed to use poly(ethylene naphthalate) (PEN) as a film base for photographic elements which are intended to be used in a cartridge of reduced diameter which requires rolling the film more tightly than previously.

CTA has generally a good mix of physical properties for various types of photographic films. However, its manufacturing process involves high levels of gaseous emissions, and it is relatively costly. The manufacturing process for PET, on the other hand, is environmentally benign. Poly(ethylene terephthalate) (PET) films exhibit excellent properties for use as photographic film base with regard to transparency, dimensional stability, mechanical strength, resistance to thermal deformation. However, compared to CTA, PET films are extremely tough and, therefore, not well suited for finishing operations, i.e., slitting, chopping and/or perforating processes, which are required in the manufacture or preparation of photographic films. Moreover, such films are difficult to cut in various steps of the photofinishing process such as splicing, notching, and sleeving. This is one of the reasons that PET materials have been considered unusable as a film base in certain consumer photographic film applications, such as 35 mm film, especially consumer films requiring non-centralized external processing or minilab processing where finishing must be easily handled. PET materials are presently used in photographic films in which less decentralized processing is not required, for example, X-ray films, motion picture films, and graphic arts films. With respect to the latter types of films, adjustments to processing can be more easily made to handle cutting and the like.

Another general problem with PET film is its tendency to take up high levels of curl during storage in cartridges at high temperatures and its inability to sufficiently lower this curl during photoprocessing as commonly exhibited by CTA-based photographic films. A solution to the latter problem was proposed in U.S. Pat. No. 5,556,739 to Nakanishi et al., U.S. Pat. No. 5,387,501 to Yajima et al., and U.S. Pat. No. 5,288,601 to Greener et al. in which multilayered supports comprise polyesters modified by sulfonate and other hydrophilic moieties that facilitate, in wet processing, recovery of curl imposed on the film during storage in a cartridge. Another general approach to lowering the tendency of a polyester film base to take up curl (core-set) during storage is through annealing at elevated temperature and/or by raising the glass transition temperature (Tg) of the polyester.

U.S. Pat. No. 3,326,689 to Murayama discloses glow discharge treatment for improved curl of a film base made from a polyester material, preferably a PEN material. In one case, the polyester material comprises a PET-type material in which 25 mol % of the glycol component repeat units are derived from CHDM. U.S. Pat. No. 5,294,473 to Kawamoto similarly discloses a PET polyester film base in which 25 mol % of the glycol component repeat units are derived from CHDM, with improved (reduced) curl.

U.S. Pat. No. 5,925,507 to Massa et al. discloses a PET film-base material having less tendency to core set, comprising polyester containing at least 430 weight % 1,4-cyclohexane dimethanol (CHDM), which polyester is blended with a polycarbonate that contains bisphenol. U.S. Pat. No. 4,141,735 to Schrader et al. discloses a polyester film base having improved core-set curl, involving the use of heat tempering, in one example using poly(1,4-cyclohexylene dimethylene terephthalate). However, this polymer crystallizes rapidly, therefore the making of its oriented film is difficult. Also, the polymer becomes opaque or hazy and useless for photographic applications where transparency is required.

The use of high heat-set temperature during the film-base manufacturing process has also been used to improve the finishability of PET-based photographic film. However, even with the demonstrated improvements in finishability, the PET-based film is still difficult to cut in various steps of the photofinishing process. U.S. Pat. No. 5,034,263 to Maier et al. disclosed a laminated film comprising a poly(ethylene terephthalate) core and, on at least one surface thereof, an overcoat of a poly(1,4-cyclohexylene dimethylene terephthalate) polyester, in order to allow the laminated film to be readily slit and perforated using techniques commonly employed with consumer film. Maier et al. states that the CHDM component should comprise at least 70 mol % of the glycol component of the polyester. However, such laminates have been found prone to delamination.

The blending or copolymerizing of conventional polyester with other polyester constituents (polymers or comonomers), in order to improve the cutting performance of a film, has also been proposed for PEN-based polyester films, as disclosed in U.S. Pat. No. 6,232,054 B1 to Okutu et al. However, PEN is generally considerably more costly and more difficult to manufacture than PET, so a clear need exists for improving the cuttability of PET-based polyester supports.

Outside the photographic field, poly(ethylene terephthalate) (PET) and poly(ethylene naphthalate) (PEN) are valuable commercial semicrystalline polyesters, which are widely used for packaging materials due to the combination of desirable properties that they possess. The high oxygen barrier properties of these polyesters render them particularly valuable for packaging oxygen-sensitive food and other goods and materials. PEN has advantages over PET due to its higher Tg and higher oxygen barrier properties, although PEN, as mentioned above, is considerably more costly and is somewhat harder to process than PET.

The toughness and cutting difficulty of PET and similar polyesters is generally attributed to the crystal structure and molecular orientation of the film. It is known that changes in these factors, driven either by formulary changes or by modified process conditions, can be used to lower the toughness and improve the cutting performance of PET. Generally, the crystallinity of PET can be lowered or altogether eliminated by adding suitable crystallization modifiers. Crystallization modifiers like isophthalic acid (IPA) and 1,4-cyclohexane dimethanol (CHDM) are often copolymerized into PET and PEN polyesters to form copolyesters that have better processing properties. Modest levels of IPA slow down crystallization and raise the oxygen barrier properties. Higher levels of IPA break up crystallinity and lead to amorphous copolyesters with good barrier properties, but these copolyesters, are known to those skilled in the art, to possess poor impact and other mechanical properties. Modest levels of CHDM also slow down crystallization, but decrease oxygen barrier properties. Higher levels of CHDM are well known to form families of amorphous copolyesters, which are widely used in commerce in a multitude of applications including heavy gauge sheet, signage, medical packages, etc. These copolyesters have excellent impact resistance and other mechanical properties, but have lower oxygen barrier properties than IPA-modified copolyesters and lower oxygen barrier properties than PET.

Amorphous copolyesters are generally defined as copolyesters that do not show a substantial melting point by differential scanning calorimetry. These copolyesters are typically based on terephthalic acid, isophthalic acid, ethylene glycol, neopentyl glycol and 1,4-cyclohexane dimethanol. It is known that amorphous copolyesters possess a combination of desirable properties, such as excellent clarity and color, toughness, chemical resistance and ease of processing. Accordingly, such copolyesters are known to be useful for the manufacture of extruded sheets, packaging materials, and parts for medical devices. For example. U.S. Pat. Nos. 5,385,773 and 5,340,907 to Yau et al. discloses polyesters of 1,4-cyclohexane dimethanol, in which the diol is present in an amount of 10–95 mol % of the glycol component, and a process for producing such copolymers by esterification. U.S. Pat. No. 6,183,848 B1 to Turner et al. disclose an amorphous copolyester comprising various amounts of comonomers derived from 1,4-cyclohexane dimethanol which, because of improved gas barrier properties, are useful for packaging perishable goods. In one embodiment, the copolyester is disclosed as a biaxially oriented sheet. Film and sheet made from various amorphous PET polyesters comprising repeat units from CHDM are sold by Eastman Chemical Company under the trademark EASTAPAK and EASTAR copolyesters.

A variety of patents disclose a multilayer film base. For example, U.S. Pat. No. 5,034,263 to Maier discloses a multilayer film base comprising a core layer of PET. U.S. Pat. No. 5,387,501 to Yajima discloses a multilayer film base comprising PET in one layer and a second layer in which CHDM may be present. U.S. Pat. No. 5,759,756 to Laney discloses a film base comprising a CHDM-containing core. WO 01/34391 to Moskala, U.S. Pat. No. 5,288,601 to Greener and U.S. Pat. No. 5,556,739 are further examples of multilayer film bases that may contain CHDM.

PROBLEM TO BE SOLVED BY THE INVENTION

Accordingly, it would be desirable to provide a PET film base with improved physical properties. In particular, it would be desirable to obtain a PET film base that is less tough and better suited for finishing operations, i.e., slitting, chopping and perforating processes, which are required in the preparation of photographic films. Moreover, it would be desirable to obtain a PET film base that is easier to cut in various steps of the photofinishing process, such as splicing, notching, and sleeving. Additionally, it would be desirable to be able to use PET as a film base in certain consumer photographic film applications and in films processed in a minilab setting. It would also be desirable for such a PET film base to have other advantageous properties such as dimensional stability and a reduced tendency to take up high levels of curl during storage in cartridges at high temperatures and/or is better able to lower this curl during photoprocessing.

SUMMARY OF THE INVENTION

This invention relates to a poly(ethylene terephthalate) photographic multilayer film base having improved properties with regard to cutting, stiffness and curl property. The multilayer film base comprises a multilayer structure, in which a tie layer comprises a PET-based polyester material having a specified amount of monomeric units derived from 1,4-cyclohexanedimethanol (CHDM), such that the support layers of the multilayer film base does not delaminate. This PET-based polyester material can be obtained either by the addition/blending of polyester polymers containing CHDM monomeric units to PET material and/or the incorporation of CHDM monomer units into a PET-polymer backbone at appropriate levels.

This invention provides an improved poly(ethylene terephthalate) (PET) multilayer film base for photographic film or other elements, having excellent dimensional stability, optical clarity and mechanical strength while also possessing an improved cuttability.

A further embodiment of the invention is directed towards a photographic element comprising at least one light sensitive silver halide-containing emulsion layer and a PET multilayer film base produced in accordance with the above embodiments.

The multilayer film base of the present invention has desirable properties for use in photographic elements. These include good stiffness, low tear strength and improved cuttability.

In the present invention, monomeric units derived from 1,4-cyclohexane dimethanol (CHDM) are also referred to as "CHDM repeat units" or "CHDM-comonomer units."

Definitions of terms, as used herein, include the following:

By "terephthalic acid," suitable synthetic equivalents, such as dimethyl terephthalate, are included. It should be understood that "dicarboxylic acids" includes the corresponding acid anhydrides, esters and acid chlorides for these acids. Regarding the glycol/diol component or acid component in a polymer or material, the mol percentages referred to herein equal a total of 100 mol %.

"PET polymer," "PET resin," "poly(ethylene terephthalate) resin," and the like refers to a polyester comprising at least 98 mol % terephthalic-acid comonomer units, based on the total acid component, and comprising at least 98 mol % of ethylene-glycol comonomer units, based on the total glycol component. This includes PET resins consisting essentially of about 100 mol % terephthalic-acid comonomer units, based on the total acid component, and consisting essentially of about 100 mol % of ethylene-glycol comonomer units, based on the total glycol component.

The term "modified PET polymer," "modified PET resin," or the like is a polyester comprising at least 70 mol % terephthalic-acid comonomer units, based on the total acid component, that has been modified so that either the acid component is less than 98 mol % of terephthalic-acid ("TA") comonomer units or the glycol component is less than 98 mol % of ethylene-glycol ("EG") comonomer units, or both the TA and EG comonomer units are in an amount less than 98 mol %. The modified PET polymer is modified with, or copolymerized with, one or more comonomers other than terephthalic-acid comonomers and/or ethylene-glycol comonomers in an amount of greater than 2 mol % (including greater than 5 mol %), of either the acid component and/or the glycol component, for example, to improve the cuttability of a film base or otherwise change the properties of the film base in which it is used. The "modified PET resin" does not necessarily need to contain any ethylene-glycol comonomer units, and it does not necessarily need to contain any acid component other than terephthalic-acid comonomer units.

In one embodiment, the "modified PET polymer" is a polyester comprising at least 80 mol % terephthalic-acid comonomer units, based on the total acid component, and at least 60 mol % ethylene-glycol (EG) comonomer units, further modified with or copolymerized with one or more additional types of comonomers, preferably in the amount of greater than 5 mol % of the acid component and/or glycol component.

The term "CHDM-modified PET" or "CHDM-modified-PET polyester" refers to a modified-PET polymer modified by the inclusion of at least 2 (including at least 3.5%) CHDM-comonomer units. In one embodiment, a modified-PET polymer is modified by the inclusion of at least 65 mol % CHDM-comonomer units, based on the total glycol component.

Similarly, the term "CHDM-modified polyester" refers to a polyester comprising at least 2 mol % (including at least 3.5 mol %/o) CHDM-comonomer units, based on total glycol component, but not necessarily comprising any specific amount of terephthalic acid component. In one embodiment, a CHDM-modified polyester comprises at least 65 mol % CHDM-comonomer units, based on total glycol component, but not necessarily comprising any specific amount of terephthalic-acid comonomer units.

The term "high-CHDM-modified PET" refers to a CHDM-modified PET polyester in which the level of CHDM-comonomer units is equal to or greater than 95 mol % (including 100 mol %). This includes both "PCT" (polycyclohexylene dimethylene terephthalate) and "PCTA," which is a copolymer of three monomers: terephthalic acid, isophthalic acid and 1,4-cyclohexane dimethanol, with 100 mol % of the 1,4-cyclohexane dimethanol based on its glycol component.

The term "high-CHDM-modified polyester" refers to a CHDM-modified polyester in which the level of CHDM-comonomer units is greater than 95 mol % (including 100 mol %), but not necessarily comprising any amount of terephthalic-acid comonomer units.

"PET-based polyester material" is a semicrystalline material comprising one or more polymers wherein at least 70% by weight of the material is one or more polymers that are either a PET polymer or modified PET polymer. Optionally, the materially may also include addenda such as silica beads, plasticizers, and the like.

A film base is made using a PET-based polyester material in the present invention. In one embodiment, preferably greater than 80% by weight, more preferably greater than 90% by weight, of the PET-based polyester material used in this invention is one or more polymers that are either a PET polymer or modified PET polymer.

DETAILED DESCRIPTION OF THE INVENTION

As indicated above, the present invention is directed to an imaging element comprising at least one light-sensitive or heat-sensitive imaging layer over a support that comprises a biaxially stretched, semicrystalline multilayer film base comprising at least two support layers and at least one tie layer.

The term "support layer" as used herein means that the layer is not a tie layer. Typically, the layer contributes to the support or rigidity of the film base. Usually, a support layer is thicker than an adjacent tie layer. Typically, the support layer has a thickness greater than 10 microns, more preferably greater than 20 microns.

The term "tie layer" as used herein means that the layer is not more than 20 microns in thickness, preferably not more than 10 microns, and provides a specified peel strength. More particularly, the peel strength, in Newtons/meter, provided by the tie layers required by the present invention, is at least twice the peel strength of the film in the absence of the tie layer, preferably at least 20 Newtons/meter.

In accordance with an imaging element according to the present invention, the imaging element comprises at least one light-sensitive or heat-sensitive imaging layer over a support comprising a biaxially stretched, semicrystalline multilayer film base comprising a first layer of a first PET-based polyester material comprising one or more polyester resins. A second layer, on one side of the first layer, comprises a second PET-based polyester material comprises one or more polyester resins. The total level of repeat units derived from 1,4-cyclohexane dimethanol in at least one of the first and second layers is at least 3.5 mole %. In other words, it is optional for one of the first and second layers to not comprise any repeat units derived from 1,4-cyclohexane dimethanol.

Furthermore, the difference in the mol %, of 1,4-cyclohexane dimethanol between the first layer and the second layer is more than 50 mol %, suitably between 50 and 100 mol %. It has been found that, in such a case, a tie layer can be used to prevent undesirable delamination.

The film base further comprises, between the first layer and the second layer, a tie layer having one surface in contact with a surface of the first layer and a second surface in contact with a surface of the second layer, the tie layer comprising at least one constituent CHDM-modified PET based polyester, wherein the average CHDM mol % in the tie layer is at least 20 mol % higher than the mol % CHDM, if any, in the layer containing the lower mol % CHDM, and at least 30-mol % lower than the mol % CHDM in the layer containing the higher mol % CHDM. Also, the tie layer contains at least one constituent CHDM-modified PET polyester wherein the difference in the mol %, of 1,4-cyclohexane dimethanol between said at least one constituent CHDM modified PET polyester and the overall mol % in the first layer, and also between the same or an optional additional CHDM modified PET polyester and the overall mol % in the second layer, is less than 50 mol %. Preferably, the tie layer contains at least one constituent CHDM-modified PET polyester wherein the difference in the overall mol %, of 1,4-cyclohexane dimethanol between the tie layer and the first layer, and also between the tie layer and the second layer is less than 50 mol %.

Typically, the total thickness of said multilayer film base is 25 to 200 microns, preferably 50 to 180 microns. The ratio of the thickness of said first layer to the sum of the one or more other support layers, excluding tie layers, in the multilayer film base is in the range 1:20 to 20:1.

In one embodiment, in a film base according to the present invention, the first layer has a higher amount of CHDM than the second layer and the thickness ratio of the first layer to the entire film base is 0.33:1 to 0.90:1. In another embodiment, the second layer has a higher amount of CHDM than the first layer and the thickness ratio of the second layer to the thickness of the entire film base is 0.05:1 to 0.40:1.

In one embodiment, the PET-based polyester material in the layer with the higher amount of CHDM can be a single polymer or can be a blend of at least two polyesters, a first polyester that is a PET polymer or a modified-PET polymer and a second polyester, the second polyester comprising repeat units derived from 1,4-cyclohexane dimethanol such that the total repeat units derived from 1,4-cyclohexane dimethanol in the polyester material is at a level between 3.5 to 25 mol % based on total glycol component in the polyester material. In one preferred embodiment, the first layer has a level of repeat units derived from 1,4-cyclohexane dimethanol that is below 10 mol % based on total glycol component in the PET-based polyester material.

The multilayer film base can consist of two support layers and one tie layer, or three or more support layers and two or more tie layers.

In a preferred embodiment consisting of three or more support layers, the multilayer film base comprises at least three support layers and at least two tie layers, including a core layer of a first PET-based polyester material comprising one or more polyester resins and, adjacent to the two face surface of the core layer, respectively, a first and a second outer layer of, respectively, a second and third PET-based polyester material comprising one or more polyester resins, in which materials the total level of repeat units derived from 1,4-cyclohexane dimethanol is greater than the mol % in the core layer, based on total glycol component in the material. In other words the core layer can have no CHDM and the two outer layers can be made of the same or different materials. In this embodiment, there is, between the core layer and each outer layer, respectively, a first and second tie layer, each having one surface side in contact with the core layer and the other surface side in contact with an outer layer, which tie layers independently comprise one or more CHDM modified PET based polyester. The average CHDM mol % in each tie layer is at least 20 mol % higher than the mol % CHDM, if any, in the core layer, and at least 30-mol % lower than the mol % CHDM in the outer layer in which it is in contact. Furthermore, each of the tie layers contains at least one constituent CHDM modified PET polyester wherein the difference in the mol %, of 1,4-cyclohexane dimethanol between said at least one constituent CHDM modified PET polyester and the overall mol % in the core layer, and also between the same or an optional additional CHDM modified PET polyester and the overall mol % in the outer layer is less than 50 mol %. Preferably, the second tie layer contains at least one constituent CHDM-modified PET polyester wherein the difference in the overall mol %, of 1,4-cyclohexane dimethanol between the tie layer and the core layer, and also between the tie layer and the outer layers is less than 50 mol %.

Another aspect of the present invention relates to a method of making a semicrystalline multilayer film base comprising coextruding a multilayer sheet comprising first coextruded sheet layer, an intermediate coextruded sheet layer, and a second coextruded sheet layer, and then biaxially stretching the coextruded multilayer sheet to obtain a semicrystalline multilayer film base comprising at least two support layers and at least one tie layer. In one embodiment of such a method, a film base is obtained that comprises a first layer, derived from the first coextruded sheet layer, of a first PET-based polyester material comprising one or more polyester resins, and, on one side of the first layer, a second layer, derived from the second coextruded sheet layer, of a PET-based polyester material comprising one or more polyester resins. In such a product, the total level of repeat units derived from 1,4-cyclohexane dimethanol in at least one of the first and second layers is at least 3.5 mole %, and the difference in the mol %, of 1,4-cyclohexane dimethanol between the first layer and the second layer is more than 50 mol %.

Between the first layer and the second layer is a tie layer derived from the intermediate coextruded sheet layer, which tie layer has one surface in contact with a surface of the first layer and a second surface in contact with a surface of the second layer, said tie layer comprising at least one CHDM-modified PET based polyester. The average CHDM mol % in the tie layer is at least 20 mol % higher than the mol % CHDM, if any, in the layer containing the lower mol % CHDM, and at least 30-mol % lower than the mol % CHDM in the layer containing the higher mol % CHDM, and the tie layer contains at least one constituent comprising a CHDM-modified PET polyester wherein the difference in the mol %, of 1,4-cyclohexane dimethanol between said at least one constituent CHDM modified PET polyester and the overall mol % in the first layer, and also between the same or an optional additional CHDM modified PET polyester and the overall mol % in the second layer, is less than 50 mol %. Preferably, the tie layer contains at least one constituent CHDM-modified PET polyester wherein the difference in the overall mol %, of 1,4-cyclohexane dimethanol between the tie layer and the first layer, and also between the tie layer and the second layer is less than 50 mol %.

The total thickness of said coextruded multilayer film base is 25 to 200 microns, the ratio of the thickness of said first layer to the sum of the one or more other support layers, excluding tie layers, in the multilayer film base is in the range 1:20 to 20:1 and the thickness of the tie layer is not more than 20 microns. The coextruded multilayer film base exhibits a peel strength, in Newtons/meter, of each of said first and second layers in contact with the tie layer, of at least twice the peel strength in the absence of the tie layer.

In accordance with another embodiment of the invention, a PET resin is blended using a suitable compounding method with a polyester containing CHDM comonomer at a sufficient level, and this blend is then used to prepare a biaxially stretched and heat-set film or sheet material under conditions similar to those used for preparing conventional PET film. In still another embodiment of this invention, a modified-PET resin comprising CHDM comonomer at a sufficient level is used to prepare a biaxially stretched and heat-set film or sheet material under conditions similar to those used for preparing conventional PET film.

As indicated above, in one embodiment of the photographic multilayer film base according to the present invention, the main layer can be made from a PET-based polyester material comprising one or more polyester resins, in which material the level of repeat units derived from 1,4-cyclohexane dimethanol (CHDM) can be between 3.5 and 25 mol %, based on total glycol component in the material, such that the cutting index (as defined in Equations 1 and 2 below) of said multilayer film base is less than 4.6. Preferably, in such a case, the multilayer film base comprises a material in which the level of repeat units derived from 1,4-cyclohexane dimethanol is between 5 and 22 mol %, based on total glycol component in the material, and the cutting index of said multilayer film base is less than 3.5. Also, preferably, less than 25 mol % of the total glycol component are aromatic, more preferably less than 10 mol %, most preferably essentially zero mol %.

In the case of a blend, the main layer of the multilayer film base of the present invention can comprise a polyester material comprising at least two polyesters, a first polyester that is a PET polymer or a modified-PET polymer that is blended with a second polyester, the second polyester comprising repeat units derived from 1,4-cyclohexane dimethanol such that the total repeat units derived from 1,4-cyclohexane dimethanol in the polyester materials is at a level between 3.5 and 25 mol % based on total glycol component in the polyester materials. In one embodiment, the first polyester may have no repeat units from 1,4-cyclohexane dimethanol and/or the second polyester may be a modified-PET polyester. In another embodiment, the second polyester may have no repeat units derived from terephthalic acid or its ester.

Preferably, the multilayer film base comprising the PET-based polyester material has a cutting index of less than 3.5, more preferably less than 3.0.

The CHDM-modified-PET polyesters used in making the articles of this invention preferably have about 100 mol % of a dicarboxylic acid portion and about 100 mol % of a glycol portion. Less than about 30 mol %, preferably not more than about 20 mol % of the dicarboxylic acid repeat units may be from other conventional acids such as those selected from succinic, glutaric, adipic, azaleic, sebacic, fumaric, maleic, itaconic, 1,4-cyclohexane-dicarboxylic, phthalic, isophthalic, and naphthalene dicarboxylic acid.

Preferably, the glycol component of the CHDM-modified-PET polyesters contain repeat units from between 3.5 and 50 mol % of 1,4-cyclohexane-dimethanol and about 96.5 to 50 mol % of ethylene glycol. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl-1,3 -propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexane dimethanol, 1,3-cyclohexane dimethanol, 2,2,4,4-tetramethyl-1,3-cyclobutanediol, polyethylene glycol of various molecular weights and the like.

In one embodiment of the invention, the CHDM-modified-PET polyesters used in the multilayer film base comprise copolyesters having a dicarboxylic acid component and a glycol component, the dicarboxylic acid component comprising repeat units from at least 80 mol % terephthalic acid (or its ester) and the glycol component comprising less than 25 mol %, preferably between about 3.5 and 25 mol %, of repeat units from 1,4-cyclohexane dimethanol and about 96.5 to 75 mol % from another glycol, preferably from ethylene glycol.

In the case of embodiments involving blends, a blend comprising at least two polyesters, wherein at least one PET polymer and/or a modified-PET polymer is blended with a CHDM-modified polyester, preferably a CHDM-modified PET polyester, such that the level of the CHDM-comonomer units in the total blend is between 3.5 and 25 mol %, preferably less than 22 mol %, more preferably less than 20 mol %. In the CHDM-modified polyester, any of the above-mentioned acid components may be used and any of the above-mentioned glycol components may be used in addition to the CHDM component.

In one embodiment, a preferred CHDM-modified PET for use in the present invention is represented by the following structure:

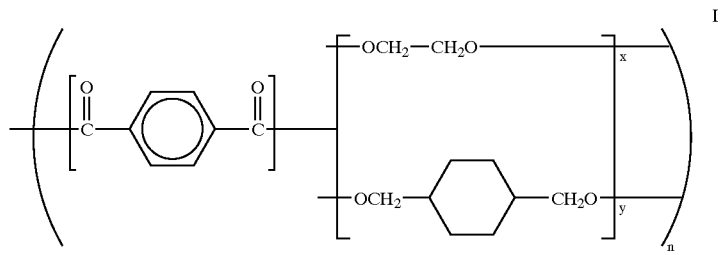

In Structure (I) above, the subscripts x and y represent the mol %, based on the total glycol component of the comonomer. Other acid or glycol monomers may be substituted to the extent described above.

Preferably, in one embodiment, a blend for use in a first layer of the multilayer base film comprises a PET polymer and a CHDM-modified polymer in the ratio of 95:5 to 5:95 more preferably 85:15 to 10:90. Preferably, the mol % of the CHDM-comonomer units relative to the total glycol component in the CHDM-modified polymer is 3.5% to 35 mol %. Preferably, the acid component in the CHDM-modified polymer is 80% to 100% of terephthalic acid component.

As indicated above, in one embodiment of the invention, a second or outer layer comprises a high-CHDM-modified PET resin that is blended, using a suitable compounding method, with a polyester containing CHDM-comonomer units at a sufficient level. This resin is then used to prepare a biaxially stretched and heat-set film under conditions similar to those used for preparing PET film base. In another embodiment of this invention, the modified-PET resin comprising CHDM comonomer at a sufficient level is used to prepare a biaxially stretched and heat-set film under conditions similar to those used for preparing PET film base. Typically, biaxially stretching the material causes amorphous material to become semicrystalline. In a typical embodiment, the crystallinity is at least 10%.

More particularly, in one embodiment of the present invention, a second layer or one or more outer layers of a photographic film base according to the present invention comprises a PET-based polyester material comprising one or more polyester resins, in which material the level of repeat units derived from 1,4-cyclohexane dimethanol (CHDM) is overall 60 to 100 mol %, preferably 65 to 95 mol %, based on total glycol component in the material, such that the cutting index (as defined in Equations 1 and 2 below) of said film base is less than 4.6, preferably less than about 3.5. Preferably, in such a case, the second or outer layers of the film base comprises a material in which the level of repeat units derived from 1,4-cyclohexane dimethanol is 70 to 95 mol %, based on total glycol component in the material, and the cutting index of said film base is less than 4.6, preferably less than 3.5. Also, preferably, less than 25 mol % of the total glycol units are aromatic.

In the case of a blend, the second or outer layer of the film base of the latter embodiment of the present invention comprises a polyester material comprising a first polyester that is a high-CHDM-modified PET polymer that is blended with a second polyester, the second polyester comprising repeat units derived from 1,4-cyclohexane dimethanol such that the total repeat units derived from 1,4-cyclohexane dimethanol in the polyester materials is at a level between 65 to 100 mol % based on total glycol component in the polyester. All polyester materials in the blend must be miscible, that is, the film produced from said blend must be optically clear, to meet the stringent optical requirements of high transparency and low haze placed on photographic film bases. Preferably, the repeat units derived from 1,4-cyclohexane dimethanol in the material of second layer of this embodiment are at a level of greater than 70, more preferably greater than 75 mol % based on total glycol component in the polyester.

The CHDM-modified-PET polyesters used in making the articles of this invention preferably have about 100 mol % of a dicarboxylic acid portion and about 100 mol % of a glycol portion. Less than about 20 mol %, preferably not more than about 10 mol % of the dicarboxylic acid repeat units may be from other conventional acids such as those selected from succinic, glutaric, adipic, azelaic, sebacic, fumaric, maleic, itaconic, 1,4-cyclohexane-dicarboxylic, phthalic, isophthalic, and naphthalene dicarboxylic acid.

Preferably, the glycol component of the CHDM-modified-PET polyesters contains repeat units comprising from 65 to 100 mol % of 1,4-cyclohexane dimethanol and from about 5 to 35 mol % of ethylene glycol. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl- 1,3 -propanediol, 2-ethyl-2-isobutyl-1,3 -propanediol, 1,3 -butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

Another embodiment of the invention involves a film base made of a PET-based polyester material in one of the layers, preferably the second or outer layers, comprising one or more polyester resins, in which material the level of repeat units derived from 1,4-cyclohane dimethanol, based on the total glycol component, is 65 to 100 mol %, and the level of repeat units derived from an acid component other than terephthalic acid or its ester is in the amount of 3 to 30 mol %, preferably 5 to 20, based on the total acid component, and wherein the cutting index of the film base is less than 4.6, preferably 3.5, more preferably less than 2.0.

The acid component other than terephthalic acid can, for example, isophthalic acid (IPA), dimethyl isophthalate, 1,4-cyclohexanedicarboxylic acid (1,4-CHDA), 1,4 cyclohexanediacetic acid, diphenyl-4,4-dicarboxylic acid, dimethyl-2,6-naphthalene-dicarboxylate, succinic acid, glutaric acid, adipic acid, azelaic acid, sebacic acid, paraphenylenedicarboxylic acid (PPDA), naphthalenedicarboxylic acid (NDA), and mixtures thereof. Preferably, the other acid component is isophthalic acid (IPA), 1,4-cyclohexanedicarboxylic acid (1,4-CHDA), paraphenylenedicarboxylic acid (PPDA), naphthalenedicarboxylic acid (NDA), and the like, and mixtures thereof.

As indicated above, the multilayer film base is useful in a photographic element comprising at least one silver-halide imaging layer over a support comprising a multilayer film base. Such a photographic element can be a photographic film or a photothermographic film.

In addition to the PET-based layer or multilayer film base according to the present invention, the support can further comprise one or more photographically acceptable subbing layers, backing layers, tie layers, magnetic layers and the like.

Subbing layers are used for the purpose of providing an adhesive force between the polyester support and an overlying photographic emulsion comprising a binder such as gelatin, because a polyester film is of a very strongly hydrophobic nature and the emulsion is a hydrophilic colloid. If the adhesion between the photographic layers and the support is insufficient, several practical problems arise such as delamination of the photographic layers from the support at the cut edges of the photographic material, which can generate many small fragments of chipped-off emulsion layers which then cause spot defects in the imaging areas of the photographic material.

Various subbing processes and materials have, therefore, been used or proposed in order to produce improved adhesion between the support film and the hydrophilic colloid layer. For example, a photographic support may be initially treated with an adhesion promoting agent such as, for example, one containing at least one of resorcinol, catechol, pyrogallol, 1-naphthol, 2,4-dinitro-phenol, 2,4,6-trinitrophenol, 4-chlororesorcinol, 2,4-dihydroxy toluene, 1,3-naphthalenediol, 1,6-naphthalenediol, acrylic acid, sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloralhydrate, and p-chloro-m-cresol. Polymers are also known and used in what is referred to as a subbing layer for promoting adhesion between a support and an emulsion layer. Examples of suitable polymers for this purpose are disclosed in U.S. Pat. Nos. 2,627,088; 2,968,241; 2,764,520; 2,864,755; 2,864,756; 2,972,534; 3,057,792; 3,071,466; 3,072,483; 3,143,421; 3,145,105; 3,145,242; 3,360,448; 3,376,208; 3,462,335; 3,475,193; 3,501,301; 3,944,699; 4,087,574; 4,098,952; 4,363,872; 4,394,442; 4,689,359; 4,857,396; British Patent Nos. 788,365; 804,005; 891,469; and European Patent No. 035,614. Often these include polymers of monomers having polar groups in the molecule such as carboxyl, carbonyl, hydroxy, sulfo, amino, amido, epoxy or acid anhydride groups, for example, acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenezensulfonate, acrylamide, N-methylamide, N-methylacrylamide, acryloylmorpholine, dimethylmethacrylamide, N-t-butylacrylamide, diacetonacrylamide, vinylpyrrolidone, glycidyl acrylate, or glycidylmethacrylate, or copolymers of the above monomers with other copolymerizable monomers. Additional examples are polymers of, for example, acrylic acid esters such as ethyl acrylate or butyl acrylate, methacrylic acid esters such as methyl methacrylate or ethyl methacrylate or copolymers of these monomers with other vinylic monomers; or copolymers of polycarboxylic acids such as itaconic acid, itaconic anhydride, maleic acid or maleic anhydride with vinylic monomers such as styrene, vinyl chloride, vinylidene chloride or butadiene, or trimers of these monomers with other ethylenically unsaturated monomers. Materials used in adhesion-promoting layers often comprise a copolymer containing a chloride group such as vinylidene chloride.

The composition of the PET-based polyester material comprising the two or more layers of the multilayer film base of the present invention can be made by conventional processes. In general, as is well known by the skilled artisan, polyesters comprise the reaction product of at least one dicarboxylic acid and at least one glycol component. The dicarboxylic acid component can typically comprise residues of terephthalic acid, isophthalic acid, 1,4-cyclohexanedicarboxylic acid, 2,6-naphthalenedicarboxylic acid, and/or mixtures thereof. Also suitable are the anhydrides thereof, acid chlorides thereof, and lower, e.g., C1–C8 alkyl esters thereof. Any isomers of the dicarboxylic acid component or mixtures thereof may be used. For example, cis, trans, or cis/trans mixtures of 1,4-cyclohexanedicarboxylic acid may be employed. Examples of suitable naphthalene dicarboxylic acid isomers include 1,4-naphthalenedicarboxylic acid, 2-6-naphthalenedicarboxylic acid, 2,7-naphthalenedicarboxylic acid or mixtures thereof.

The polyester polymers used in the present invention can be prepared by a process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system. An example of a preferred catalyst and inhibitor system is about 0–75 ppm Mn, about 50–150 ppm Zn, about 5–200 ppm Ge, about 5–20 ppm Ti and about 10–80 ppm P, all parts by weight based on the weight of the copolyester.

Either dimethyl terephthalate (or other lower dialkyl terephthalate ester) or terephthalic acid can be used in producing the copolyester. Thus, the term "terephthalic acid component, monomer, repeat unit, or portion" herein is meant to include either the acid or ester form. These materials are commercially available. The glycols CHDM and ethylene glycol are also commercially available. Either the cis or trans isomer of CHDM, or mixture thereof, may be used in accordance with the present invention.

Generally, the copolyesters may be produced using conventional polyesterification procedures described, for example, in U.S. Pat. Nos. 3,305,604 and 2,901,460, the disclosures of which are incorporated herein by reference. The amorphous or semi-crystalline copolyesters according to the invention are prepared by conventional polymerization processes known in the art, such as disclosed by U.S. Pat. Nos. 4,093,603 and 5,681,918, the disclosures of which are herein incorporated by reference. Examples of polycondensation processes useful in making the PET material of the present invention include melt phase processes conducted with the introduction of an inert gas stream, such as nitrogen, to shift the equilibrium and advance to high molecular weight or the more conventional vacuum melt phase polycondensations, at temperatures ranging from about 240° C. to about 300° C. or higher which are practiced commercially. Although not required, conventional additives may be added to the copolyester materials of the invention in typical amounts. Such additives include pigments, colorants, stabilizers, antioxidants, extrusion aids, slip agents, carbon black, flame retardants and mixtures thereof.

Various modified-PET polyesters comprising repeat units from CHDM, which can be used in the present invention, are commercially available from Eastman Chemical Company (Kingsport, Tenn.) under the trademark EASTAPAK and EASTAR copolyester, as described at http://www.eastman.com.

Photographic elements of this invention can have the structures and components shown in Research Disclosure Item 37038 and can be imagewise exposed and processed using known techniques and compositions, including those described in the Research Disclosure Item 37038 cited above.

The multilayer film base may be manufactured by a process of casting, biaxial stretching and heat-setting. The process for making PET multilayer film base typically comprises the steps of coextruding and casting the molten film base onto a casting surface along the machine direction to form a continuous sheet, drafting the sheet by stretching in the machine direction, tentering the sheet by stretching in the transverse direction, heat-setting the drafted and tentered sheet, and cooling the heat-set sheet to form a stretched, heat-set PET film, such as described in, e.g., U.S. Pat. No. 4,141,735 to Schrader et al., the disclosure of which is incorporated in its entirety by reference herein. Alternately, the stretching of the film in the machine and transverse directions can be performed simultaneously using appropriate machinery.

Preferably, in order to improve its dimensional stability, the multilayer film base is heat treated at temperatures from Tg–50° C. up to Tg for times ranging from 1 hr to 1500, preferably not more than 1000 hrs, where Tg is the glass transition temperature of the polyester material.

In one particular embodiment, the process for preparing films from the resin compositions of this invention comprises the following steps:

(1) The film base material is cast under molten conditions upon a cooling surface to form a continuous cast sheet. Preferably, the molten polyester resin has an inherent viscosity of from 0.5 to 0.8 dl/g, and is cast at a temperature of from 250 to 310° C. while the casting surface has a temperature of from 40 to 70° C. The inherent viscosity (IV) is measured at 25° C. in a solvent mixture of phenol/chlorobenzene (60/40 by weight) at a concentration of 0.25 g/dl with a Ubbelhode glass viscometer.

(2) The continuous sheet is removed from the casting surface and passed into a drafting zone where it is first preheated and then stretched in the machine direction at a stretch ratio of 2.0 to 4.0, at a temperature of from about 80°

C. to 110° C. The drafting zone typically includes two sets of nipped rollers, the first being the entrance to the drafting zone and the second the exit from the drafting zone. To achieve the stretch ratios necessary for the practice of this invention, the exit nip rollers are rotated at a speed greater than the entrance nip rollers. The film may be cooled in the last stage of the drafting zone to 25° C. to 40° C.

(3) The film moves from the drafting zone into a tentering zone where it is preheated and stretched in the transverse direction at a stretch ratio of 2.0 to 4.0, at a temperature of from about 80° C. to 115° C. The tentering zone typically includes a means for engaging the film at its edges and stretching such that the final width is from 2.0 to 4.0 times that of the original width.

(4) The film is next heat-set by maintaining it at a temperature of at least 180° C., but below the melting point of the resin, preferably at least 200° C. to 240° C., while being constrained as in the tentering zone for a time sufficient to affect heat-setting. Times longer than necessary to bring about this result are not detrimental to the film; however, longer times are undesired as the lengthening of the zone requires higher capital expenditure without achieving additional advantage. The heat-setting step is typically accomplished within a time period of 0.1 to 15 seconds and preferably 0.1 to 10 seconds. Finally, the film is cooled without substantial detentering (the means for holding the edges of the film do not permit greater than 2% shrinkage thereof).

Preferably, the film base is heat treated at temperatures from 50° C. up to $Tg_H$ where $Tg_H$ is the higher glass transition of the two polyesters in the two support layers of the film base described above, for times ranging from 1 hr to 1500 hrs. More preferably, the film base is heat treated at temperatures from 50° C. up to $Tg_H$, where $Tg_H$ is the higher glass transition of the two polyesters, for times ranging from 1 hr to 1500 hrs, and then has been subsequently heat treated at temperatures from 50° C. up to $Tg_L$, where $Tg_L$ is the lower glass transition of the two polyesters, for times ranging from 1 hr to 1500 hrs.

With regard to cuttability, it is generally known in the art of sheet material cutting that the cutting process combines crack formation and propagation. To form a crack, one needs to apply cutters to cause compression on the surfaces of the sheet material until the material is deformed and its break point is reached. Once the material's break point is reached, a crack would be formed, which starts the second stage of cutting—crack propagation. One can maintain and eventually complete the cutting process by compressing the sheet material further using the cutters. Eventually, the cutting would be completed as cracks propagate through the sheet thickness.

To evaluate the cuttability of a given material, one needs to evaluate how the material behaves during the crack formation and propagation stages. If the material absorbs and dissipates more mechanical energy during the crack formation and propagation processes, it is said to be more difficult to cut and will have a lower cuttability. Two standard tests can be used to evaluate how much mechanical energy a material absorbs and dissipates during the said crack formation and propagation steps. One is the tensile test (ASTM D882) and the other is the tear test (ASTM D1938). The former can be used to evaluate the crack formation part of the cutting process, and the latter can be used to assess the crack propagation part of the cutting process.

The mechanical and cutting properties of the polyester films of the present invention were evaluated in accordance with the following procedures:

Tensile Properties: Modulus and tensile toughness can be determined using a tensile test such as that described in ASTM D882. A tensile test consists of pulling a sample of material with a tensile load at a specified rate until it breaks. The test sample used may have a circular or a rectangular cross section. From the load and elongation history, a stress-strain curve is obtained with the strain being plotted on the x-axis and stress on the y-axis. The modulus is defined as the slope of the initial linear portion of the stress-strain curve. The modulus is a measure of the stiffness of the material. The tensile toughness is defined as the area under the entire stress-strain curve up to the fracture point. The tensile toughness is a measure of the ability of a material to absorb energy in a tensile deformation. Both modulus and tensile toughness are fundamental mechanical properties of the material.

Tear Strength: The resistance to tear can be determined using a tear test such as that described in ASTM D1938. The test measures the force to propagate tearing in a fracture mode III. The test sample used has a rectangular shape and a sharp long cut in the middle. The separated two arms are then fixed in a conventional testing machine such as Instron®. The fixtures move at constant speed to prolong the preexisting cut and the steady state force of tearing is recorded.

Cutting Index: It is generally known that tensile toughness represents the energy required to initiate a crack, while fracture toughness determines the energy needed to further propagate the crack. As typical cutting processes involve both crack initiation and crack propagation, a quantity of cuttability can be defined based on these two fundamental material quantities. Tensile toughness can be evaluated through tensile testing. Fracture toughness $G_c$ can be calculated from the tear strength $$G_c = 2P_c/b \tag{1}$$

where $P_c$ is the load at tear crack growth and b is the specimen thickness. (See Rivlin, R. S. & Thomas, A. G., (1953), J. Polym. Sci., 10, 291).

For practical simplicity, a dimensionless quantity of cutting index is defined as follows, $$C = 0.5 * W_t/W_{tr} + 0.5 * G_c/G_{cr} \tag{2}$$

where C is the cutting index, $W_t$ is tensile toughness and $G_c$ is fracture toughness, and $W_{tr}$ and $G_{cr}$ are the corresponding properties of a reference material, where CTA is selected as the reference material of this invention. The cutting indices of commonly used film base materials such as PET, PEN and CTA correspond well to their practical cutting performance. Generally, it is desirable for C to be close to 1 (CTA value).

The polyester films having the properties set forth above and prepared by the process described above are less likely to fail and more likely to produce cleaner cut surfaces in various cutting operations. In fact, the films prepared in accordance with this invention compare favorably with CTA, which has been the film base of choice for a long time in the photographic industry because of its special physical characteristics.

The present invention is described in greater detail below by referring to the Examples. However, the present invention should not be construed as being limited thereto.

EXAMPLES

Materials:

The polymer films described in the following examples are prepared using the following commercial polymer resins.

Polyester-1: EASTAPAK PET Polyester 7352 (Trademark of Eastman Chemical Company, USA) is a PET resin.

Polyester-2: EASTAR Copolyester A150 (Trademark of Eastman Chemical Company, USA). The material is a copolymer of poly(cyclohexane dimethylene isophthalate) and poly(cyclohexylene dimethylene terephthalate) (PCDT) with approximately 100 mol % of cyclohexane dimethanol (CHDM) comonomer units in its glycol component and approximately 17 mol % of isophthalic diacid in its diacid component.

Polyester-3: EASTAR Copolyester 15086 (Trademark of Eastman Chemical Company, USA) is a copolymer of PET and PCDT with approximately 13 mol % of CHDM comonomer units in its glycol component.

Polyester-4: EASTAR Copolyester 5445 (Trademark of Eastman Chemical Company, USA) is a copolymer of PET and PCDT with approximately 62 mol % of CHDM monomer units in its glycol component.

Polyester-5: EASTAR Copolyester 6763 (Trademark of Eastman Chemical Company, USA) is a copolymer of PET and PCDT with approximately 31 mol % of CHDM monomer units in its glycol component.

Polyester-6: PCTG 10179 (Trademark of Eastman Chemical Company, USA) is a copolymer of PET and PCDT with approximately 81 mol % of CHDM in its glycol component.

Polymer Blend-1: (A) EASTAR Copolyester 15086 (Trademark of Eastman Chemical Company, USA) and (B) EASTAR Copolyester 5445 (Trademark of Eastman Chemical Company, USA) were dried at 66° C. and mixed as resins at a weight ratio of 67:33, respectively, to be melt kneaded upon final extrusion into polymer sheet. The resulting blend contained approximately 29 mol % of CHDM monomer units in its glycol component.

Polymer Blend-2: (A) EASTAR Copolyester 15086 (Trademark of Eastman Chemical Company, USA) and (B) EASTAR Copolyester 5445 (Trademark of Eastman Chemical Company, USA) were dried at 66° C. and mixed as resins at a weight ratio of 33:67, respectively, to be melt kneaded upon final extrusion into polymer sheet. The resulting blend contained approximately 46 mol % of CHDM monomer units in its glycol component.

Polymer Blend-3: (A) EASTAR Copolyester 6763 (Trademark of Eastman Chemical Company, USA) and (B) EASTAR Copolyester 10179 (Trademark of Eastman Chemical Company, USA) were dried at 66° C. and mixed as resins at a weight ratio of 50:50, respectively, to be melt kneaded upon final extrusion into polymer sheet. The resulting blend contained approximately 56 mol % of CHDM monomer units in its glycol component.

Polymer Blend-4: (A) EASTAR Copolyester 5445 (Trademark of Eastman Chemical Company, USA) and (B) EASTAR Copolyester 6763 (Trademark of Eastman Chemical Company, USA) were dried at 66° C. and mixed as resins at a weight ratio of 25:75, respectively, to be melt kneaded upon final extrusion into polymer sheet. The resulting blend contained approximately 39 mol % of CHDM monomer units in its glycol component.

Polymer Blend-5: (A) EASTAR Copolyester 5445 (Trademark of Eastman Chemical Company, USA) and (B) EASTAR Copolyester 6763 (Trademark of Eastman Chemical Company, USA) were dried at 66° C. and mixed as resins at a weight ratio of 50:50, respectively, to be melt kneaded upon final extrusion into polymer sheet. The resulting blend contained approximately 47 mol % of CHDM monomer units in its glycol component.

Polymer Blend-6: (A) EASTAR Copolyester A150 (Trademark of Eastman Chemical Company, USA) and (B) EASTAR Copolyester 5445 (Trademark of Eastman Chemical Company, USA) were dried at 66° C. and mixed as resins at a weight ratio of 50:50, respectively, to be melt kneaded upon final extrusion into polymer sheet. The resulting blend contained approximately 81 mol % of CHDM monomer units in its glycol component.

Example 1

Polyester-1 resin and Polyester-2 resin were converted into a multilayer film having a central tie layer made of Polymer Blend-1 using the process of melt co-extrusion and biaxial stretching. The resins were extruded through separate manifolds in a sheet-forming co-extrusion die at about 300° C. and cast onto a cooling surface at about 60° C. to form a continuous three-layer cast sheet (laminate) having two outer layers with a central adhesive tie layer. The sheet was removed from the cooling surface, cut into a 13 cm×13 cm square, and then stretched at about 105° C. to about 3.3 times its dimensions in the extrusion and transverse directions, simultaneously, using a standard laboratory film stretching unit. Immediately after stretching the film was quenched to room temperature with compressed air. The interlayer adhesion was determined using a peel test as described below. The results are reported in Table 1 below.

Example 2

The film manufacturing process of Example 1 was repeated except that the tie layer was comprised of Polymer Blend-2. The resins were extruded through separate manifolds in a sheet-forming co-extrusion die at about 300° C. and cast onto a cooling surface at about 60° C. to form a continuous three-layer cast sheet (laminate) having two outer layers with a central adhesive tie layer. The cast sheet was stretched at about 105° C. to about 3.3 times its dimensions in the extrusion and transverse directions, simultaneously, using a standard laboratory film stretching unit. The thickness of the tie layer was approximately 6 μm. The interlayer adhesion was determined using a peel test as described below. The results are reported in Table 1 below.

Example 3

The film manufacturing process of Example 1 was repeated except that the tie layer was comprised of Polymer Blend-3. The resins were extruded through separate manifolds in a sheet-forming co-extrusion die at about 300° C. and cast onto a cooling surface at about 60° C. to form a continuous three-layer cast sheet (laminate) having two outer layers with a central adhesive tie layer. The cast sheet was stretched at about 105° C. to about 3.3 times its dimensions in the extrusion and transverse directions, simultaneously, using a standard laboratory film stretching unit. The thickness of the tie layer was approximately 6 μm. The interlayer adhesion was determined using a peel test as described below. The results are reported in Table 1 below.

Example 4

The film manufacturing process of Example 1 was repeated except that Polyester-3 was co-extruded with Polymer Blend-6 having a tie layer comprised of Polymer Blend-4. The resins were extruded through separate manifolds in a sheet-forming co-extrusion die at about 300° C. and cast onto a cooling surface at about 60° C. to form a continuous three-layer cast sheet (laminate) having two outer layers with a central adhesive tie layer. The cast sheet was stretched at about 100° C. to about 3.3 times its dimensions in the extrusion and transverse directions, simultaneously, using a standard laboratory film stretching unit. The thickness of the tie layer was approximately 6 μm. The interlayer adhesion was determined using a peel test as described below. The results are reported in Table 1 below.

Example 5

The film manufacturing process of Example 1 was repeated except that Polyester-3 was co-extruded with Polymer Blend-6 having a tie layer was comprised of Polymer Blend-5. The resins were extruded through separate manifolds in a sheet-forming co-extrusion die at about 300° C. and cast onto a cooling surface at about 60° C. to form a continuous three-layer cast sheet (laminate) having two outer layers with a central adhesive tie layer. The cast sheet was stretched at about 100° C. to about 3.3 times its dimensions in the extrusion and transverse directions, simultaneously, using a standard laboratory film stretching unit. The thickness of the tie layer was approximately 6 μm. The interlayer adhesion was determined using a peel test as described below. The results are reported in Table 1 below.

Comparative Example 6

The film manufacturing process of Example 1 was repeated except that the tie layer was omitted. Polyester-1 resin and Polyester-2 resin were co-extruded in direct contact with each other. The resins were extruded through separate manifolds in a sheet-forming co-extrusion die at about 300° C. and cast onto a cooling surface at about 60° C. to form a continuous two-layer cast sheet (laminate). The cast sheet was stretched at about 100° C. to about 3.3 times its dimensions in the extrusion and transverse directions, simultaneously, using a standard laboratory film stretching unit. The interlayer adhesion was determined using a peel test as described below. The results are reported in Table 1 below.

Comparative Example 7

The film manufacturing process of Example 1 was repeated except that the tie layer was omitted. Polyester-3 resin and Polymer Blend-6 resin were co-extruded in direct contact with each other. The resins were extruded through separate manifolds in a sheet-forming co-extrusion die at about 300° C. and cast onto a cooling surface at about 60° C. to form a continuous two-layer cast sheet (laminate). The cast sheet was stretched at about 100° C. to about 3.3 times its dimensions in the extrusion and transverse directions, simultaneously, using a standard laboratory film stretching unit. The interlayer adhesion was determined using a peel test as described below. The results are reported in Table 1 below.

Physical Property Evaluation: The co-extruded multilayer films described above were evaluated for interlayer adhesion performance described as follows.

Interlayer Adhesion Measurement: Interlayer adhesion was assessed by using a peel test. The more brittle surface layer of a multilayer film sample was glued to a firm surface. A tape was applied to the other exposed surface and then peeled away. Peeling was accomplished by gripping the tape, bending it through a 180° angle until it could be pulled away (peeled) in a direction parallel to the film surface. When the interlayer adhesion of the film is weak, the layer attached to the tape is peeled away. By securing the more brittle layer to the firm surface, it does not deform as the other layer is peeled away. This keeps the brittle layer intact during testing. All tests were performed in a standard environment of 50% RH and 23° C. The films were peeled using an IMASS SP-2000 Slip/Peel Tester. The crosshead speed was 5.1 mm/sec. The sample size was 1.5 cm×15.2 cm. Eleven specimens were tested per film sample. The adhesion performance is reported below as the force required to peel the layers apart.

TABLE 1

| Example | Top Layer CHDM (mol %) | Bottom Layer CHDM (mol %) | Tie Layer CHDM (mol %) | Tie Layer Blend Polymer (A) CHDM (mol %) | Tie Layer Blend Polymer (B) CHDM (mol %) | Average Peel Strength (N/m) |
|---|---|---|---|---|---|---|
| 1 | 0 | 100 | 29 | 13 | 62 | 21.8 |
| 2 | 0 | 100 | 46 | 13 | 62 | 51.8 |
| 3 | 0 | 100 | 56 | 31 | 81 | 99.0 |
| 4 | 13 | 81 | 39 | 62 | 31 | 146.7 |
| 5 | 13 | 81 | 47 | 62 | 31 | 58.0 |
| Comparative 6 | 0 | 100 | N/A | N/A | N/A | 2.2 |
| Comparative 7 | 13 | 81 | N/A | N/A | N/A | 4.8 |

Comparative Examples 6 and 7 show that polyester materials exhibit poor interlayer film adhesion when there is greater than approximately a 50 mol % difference in CHDM content, based on the total glycol component, between the materials. Examples 1, 2, 3, 4, and 5 show that a tie layer of transitional CHDM content co-extruded between the dissimilar polyesters of Comparative Examples 1 and 2 provides improved interlayer adhesion. These examples also show that the optimum CHDM composition in the tie layer is not midway between the compositions of the outer layers.

The examples show that when polymer blends are used for the tie layers, the CHDM content in the tie layer may be more than 50 mol % different from one of the outer layers provided that at least one blend constituent is within 50 mol % in CHDM composition of each layer, based on the total glycol component.

The invention has been described in detail with particular reference to certain preferred embodiments thereof, but it will be understood that variations and modifications can be effected within the spirit and scope of the invention.

What is claimed is:

1. An imaging element comprising at least one light-sensitive or heat-sensitive imaging layer over a support comprising a biaxially stretched, semicrystalline multilayer film base comprising at least two support layers and at least one tie layer:
   a) a first layer of a first PET-based polyester material comprising one or more polyester resins;
   b) on one side of the first layer, a second layer of a PET-based polyester material comprising one or more polyester resins,
   wherein the total level of repeat units derived from 1,4-cyclohexane dimethanol in at least one of the first and second layers is at least 3.5 mole %;
   wherein the difference in the mol %, of 1,4-cyclohexane dimethanol between the first layer and the second layer is more than 50 mol %;

(c) between the first layer and the second layer a tie layer have one surface in contact with a surface of the first layer and a second surface in contact with a surface of the second layer, said tie layer comprising at least one CHDM-modified PET based polyester;

wherein the average CHDM mol % in the tie layer is at least 20 mol % higher than the mol % CHDM, if any, in the layer containing the lower mol % CHDM, and at least 30-mol % lower than the mol % CHDM in the layer containing the higher mol % CHDM;

wherein the tie layer contains at least one constituent comprising a CHDM-modified PET polyester wherein the difference in the mol %, of 1,4-cyclohexane dimethanol between the at least one constituent CHDM-modified PET polyester and the overall mole percent in the first layer, and also between the same or an optional additional CHDM modified PET polyester and the overall mol % in the second layer is less than 50 mol %;

wherein the peel strength, in Newtons/meter, of said two layers in contact with the tie layer is at least twice the peel strength of the film in the absence of the tie layer;

wherein the total thickness of said multilayer film base is 25 to 200 microns, the ratio of the thickness of said first layer to the sum of the one or more other support layers, excluding tie layers, in the multilayer film base is in the range 1:20 to 20:1; and the thickness of the tie layer is not more than 20 microns.

2. The imaging element in claim 1 wherein said first and second layers are each greater than 10 microns in thickness.

3. The imaging element in claim 1 comprising at least at least three support layers and at least two tie layers, wherein said tie layer is a first tie layer, wherein one of the first and second layers is a core layer and the other layer is an outer layer, and further comprising:

(d) a third layer on the opposite side of the core layer from the other layer, which third layer comprises a third PET-based polyester material, and wherein the difference in the mol %, of 1,4-cyclohexane dimethanol between the third layer and the core layer is more than 50 mol %;

(e) between the third layer and the core layer, a second tie layer having a first surface in contact with a surface of the third layer and a second surface in contact with a surface of the core layer opposite to the surface of the core layer in contact with the first tie layer, which second tie layer comprises one or more CHDM-modified PET based polyesters;

wherein the average CHDM mol % in the second tie layer is at least 20 mol % higher than the mol % CHDM, if any, in the one of the third layer and the core layer containing the lower mol % CHDM, and at least 30-mol % lower than the mol % CHDM in the other of the third layer and core layer containing the higher mol % CHDM;

wherein the second tie layer contains at least one constituent CHDM-modified PET polyester wherein the difference in the mol %, of 1,4-cyclohexane dimethanol between said at least one constituent CHDM modified PET polyester and the overall mol % in the core layer, and also between the same or an optional additional CHDM modified PET polyester and the overall mol % in the third layer, is less than 50 mol %, and f) wherein the peel strength, in Newtons/meter, of the core layer and the third layer of the film in contact with the second tie layer is at least twice the peel strength of the film in the absence of the tie layer; and wherein the thickness of each of the first and second tie layer is not more than 20 microns.

4. The imaging element of claim 1 wherein the multilayer film base consists of only two support layers, said first layer and said second layer and the peel strength of said two layers in contact with the tie layer is at least 20 Newtons/meter.

5. The imaging element of claim 1 wherein the first layer has a higher amount of CHDM than the second layer and the thickness ratio of the first layer to the entire film base is 0.33:1 to 0.90:1.

6. The imaging element of claim 1 wherein the second layer has a higher amount of CHDM than the first layer and the thickness ratio of the second layer to the thickness of the entire film base is 0.05:1 to 0.40:1.

7. The imaging element of claim 1 wherein the PET-based polyester material in the layer with the higher amount of CHDM is a blend of at least two polyesters, a first polyester that is a PET polymer or a modified-PET polymer and a second polyester, the second polyester comprising repeat units derived from 1,4-cyclohexane dimethanol such that the total repeat units derived from 1,4-cyclohexane dimethanol in the polyester material is at a level between 3.5 to 25 mol % based on total glycol component in the polyester material.

8. The imaging element of claim 1 wherein, in the first layer, the level of repeat units derived from 1,4-cyclohexane dimethanol is below 10 mol % based on total glycol component in the PET-based polyester material.

9. The imaging element of claim 1 wherein the material in the second layer consists of a single CHDM-modified PET polyester.

10. The imaging element of claim 1 wherein the film base has been manufactured by a process of melt extrusion, casting, biaxial stretching and heat-setting.

11. The imaging element of claim 1 wherein the film base has been heat treated at temperatures from 50° C. up to $Tg_H$ where $Tg_H$ is the higher glass transition of the two polyesters in claim 1, for times ranging from 1 hr to 1500 hrs.

12. The imaging element of claim 1 wherein the film base has been heat treated at temperatures from 50° C. up to $Tg_H$ where $Tg_H$ is the higher glass transition of the two polyesters in claim 1, for times ranging from 1 hr to 1500 hrs, and then has been subsequently heat treated at temperatures from 50° C. up to $Tg_L$, where $Tg_L$ is the lower glass transition of the two polyesters in claim 1, for times ranging from 1 hr to 1500 hrs.

13. The imaging element of claim 1 wherein the imaging layer comprises a silver halide emulsion.

14. The imaging element of claim 1 wherein the light-sensitive imaging layer is sensitive to X-ray exposure.

15. The imaging element of claim 1 wherein the element is a photographic film or a photothermographic film.

16. The imaging element of claim 1 wherein the element is a 35-mm photographic film.

17. The imaging element of claim 1 further comprising a photographically acceptable subbing layer and backing layers on the film base.

18. The imaging element of claim 1 wherein the film base bears a magnetic or optical recording layer.

19. An imaging element comprising at least one light-sensitive or heat-sensitive imaging layer over a support comprising a biaxially stretched, semicrystalline multilayer film base comprising at least three support layers and at least two tie layers:

a) a core layer of a first PET-based polyester material comprising one or more polyester resins;

b) adjacent to the two face surface of the core layer, respectively, a first and a second outer layer of, respectively, a second and third PET-based polyester material comprising one or more polyester resins, in which materials the total level of repeat units derived from 1,4-cyclohexane dimethanol is greater than the mol % in the core layer, based on total glycol component in the material;

wherein between the core layer and each outer layer there is, respectively, a first and second tie layer, each having one surface side in contact with the core layer and the other surface side in contact with an outer layer, which tie layers independently comprise one or more CHDM modified PET based polyester;

wherein the average CHDM mol % in each tie layer is at least 20 mol % higher than the mol % CHDM, if any, in the core layer, and at least 30-mol % lower than the mol % CHDM in the outer layer in which it is in contact;

wherein the tie layers each contain at least one constituent CHDM-modified PET polyester wherein the difference in the mol %, of 1,4-cyclohexane dimethanol between said at least one constituent CHDM modified PET polyester and the overall mol % in the core layer, and also between the same or an optional additional CHDM modified PET polyester and the overall mol % in the outer layer with which the tie layer is in contact, is less than 50 mol %;

wherein the peel strength, in Newtons/meter, of each of said two outer layers in contact, respectively, with the first and second tie layer is at least twice the peel strength of the film in the absence of the tie layer; and wherein the total thickness of said multilayer film base is 25 to 200 microns, the ratio of the thickness of said core layer to the sum of the other support layers, excluding tie layers, in the multilayer film base is in the range 1:20 to 20:1 and said two tie layers are no more than 20 microns thick.

20. The imaging element of claim 19 wherein each tie layer contains at least one constituent CHDM-modified PET polyester wherein the difference in the overall mol %, of 1,4-cyclohexane dimethanol between the tie layer and the core layer, and also between the tie layer and the outer layer with the tie layer is in contact is less than 50 mol %.

21. The imaging element of claim 19 wherein the peel strength of said two layers in contact with the tie layers is each at least 20 Newtons/meter.

22. A method of image formation comprising the use of an imaging element according to claim 1 in a one-time-use camera.

23. The imaging element of claim 19 wherein the outer layers are the same material.

24. The imaging element of claim 19 wherein the core layer contains no CHDM.

25. A method of making a semicrystalline multilayer film base comprising coextruding a multilayer sheet comprising first coextruded sheet layer, an intermediate coextruded sheet layer, and a second coextruded sheet layer, and then biaxially stretching the coextruded multilayer sheet to obtain a semicrystalline multilayer film base comprising at least two support layers and at least one tie layer, which film base comprises:

a) a first layer, derived from the first coextruded sheet layer, of a first PET-based polyester material comprising one or more polyester resins;

b) on one side of the first layer, a second layer, derived from the second coextruded sheet layer, of a PET-based polyester material comprising one or more polyester resins, wherein the total level of repeat units derived from 1,4-cyclohexane dimethanol in at least one of the first and second layers is at least 3.5 mole %;

wherein the difference in the mol %, of 1,4-cyclohexane dimethanol between the first layer and the second layer is more than 50 mol %;

(c) between the first layer and the second layer a tie layer, derived from the intermediate coextruded sheet layer, having one surface in contact with a surface of the first layer and a second surface in contact with a surface of the second layer, said tie layer comprising at least one CHDM-modified PET based polyester;

wherein the average CHDM mol % in the tie layer is at least 20 mol % higher than the mol % CHDM, if any, in the layer containing the lower mol % CHDM, and at least 30-mol % lower than the mol % CHDM in the layer containing the higher mol % CHDM;

wherein the second tie layer contains at least one constituent CHDM-modified PET polyester wherein the difference in the mol %, of 1,4-cyclohexane dimethanol between said at least one constituent CHDM modified PET polyester and the overall mol % in the core layer, and also between the same or an optional additional CHDM modified PET polyester and the overall mol % in the third layer, is less than 50 mol %, and wherein the total thickness of said multilayer film base is 25 to 200 microns, the ratio of the thickness of said first layer to the sum of the one or more other support layers, excluding tie layers, in the multilayer film base is in the range 1:20 to 20:1 and the thickness of the tie layer is not more than 20 microns; and wherein the coextruded multilayer film base exhibits a peel strength, in Newtons/meter, of each of said first and second layers in contact with the tie layer, of at least twice the peel strength in the absence of the tie layer.

* * * * *